US009742200B2

(12) United States Patent
Werner et al.

(10) Patent No.: US 9,742,200 B2
(45) Date of Patent: Aug. 22, 2017

(54) SYSTEM AND METHOD TO AVOID MAGNETIC POWER LOSS WHILE PROVIDING ALTERNATING CURRENT THROUGH A FERROMAGNETIC MATERIAL

(71) Applicant: QUALCOMM Incorporated, San Diego, CA (US)

(72) Inventors: Michael Werner, Markt Schwaben (DE); Wojciech Chlebosz, Taufkirchen (DE); Daniel Kuerschner, Grasbrunn (DE); Leandro A. Percebon, Munich (DE); Edward L. van Boheemen, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 14/464,583

(22) Filed: Aug. 20, 2014

(65) Prior Publication Data
US 2015/0162753 A1    Jun. 11, 2015

Related U.S. Application Data

(60) Provisional application No. 61/913,775, filed on Dec. 9, 2013.

(51) Int. Cl.
*H01F 27/42*    (2006.01)
*H02J 5/00*    (2016.01)
(Continued)

(52) U.S. Cl.
CPC .............. *H02J 5/005* (2013.01); *H01F 27/34* (2013.01); *H01F 38/14* (2013.01); *H01F 41/02* (2013.01);
(Continued)

(58) Field of Classification Search
USPC ........................................... 307/104
See application file for complete search history.

(56) References Cited

U.S. PATENT DOCUMENTS 4,538,863 A    9/1985    Allen et al.
5,341,280 A *  8/1994    Divan ................... H01F 38/14
                                                              320/109

(Continued)

FOREIGN PATENT DOCUMENTS

CN        101630562 A    1/2010
CN        101636800 A    1/2010
(Continued)

OTHER PUBLICATIONS

International Search Report and Written Opinion—PCT/US2014/068181—ISA/EPO—Mar. 12, 2015.

(Continued)

*Primary Examiner* — Danny Nguyen

(57) ABSTRACT

This disclosure provides systems, methods and apparatus for avoiding magnetic power loss while providing alternating current through a ferromagnetic material. In one aspect, the ferromagnetic material includes at least one orifice. At least one electrical conduit extends through the at least one orifice from a first region on a first side of the ferromagnetic material to a second region on a second side of the ferromagnetic material, the second side opposite to the first side. The at least one electrical conduit is configured to have at least one alternating current flowing along the at least one electrical conduit between the first region and the second region. The ferromagnetic material and the at least one electrical conduit are configured to reduce power loss caused by a circumferential magnetic flux generated within the ferromagnetic material by the at least one alternating current.

34 Claims, 14 Drawing Sheets

(51) Int. Cl.
*H01F 41/02* (2006.01)
*H01F 27/34* (2006.01)
*H01F 38/14* (2006.01)

(52) U.S. Cl.
CPC ...... *Y10T 29/4902* (2015.01); *Y10T 29/49075* (2015.01)

(56) References Cited

U.S. PATENT DOCUMENTS

| | | |
|---|---|---|
| 6,621,183 B1 | 9/2003 | Boys |
| 7,868,725 B2 | 1/2011 | Sutardja |
| 8,102,236 B1 | 1/2012 | Fontana, Jr. et al. |
| 2010/0007215 A1 | 1/2010 | Sakuma |

FOREIGN PATENT DOCUMENTS

| | | |
|---|---|---|
| CN | 102906828 A | 1/2013 |
| EP | 2595160 A2 | 5/2013 |
| EP | 2667390 A1 | 11/2013 |
| EP | 2743944 A1 | 6/2014 |
| JP | 2007317914 A | 12/2007 |
| JP | 2008210863 A | 9/2008 |
| WO | WO-2012131402 A2 | 10/2012 |
| WO | WO-2013128554 A1 | 9/2013 |

OTHER PUBLICATIONS

Anonymous: "Samsung electro-mechanics japan advanced technology co., ltd; "disk drive device with hub with thinness and suppressed torque decrease", in patent application approval process," Journal of Engineering, 2014, pp. 3.

* cited by examiner

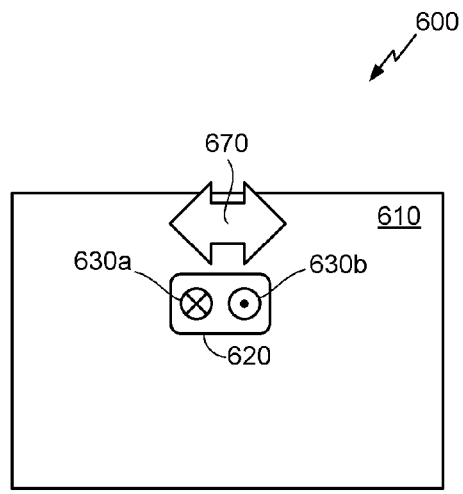
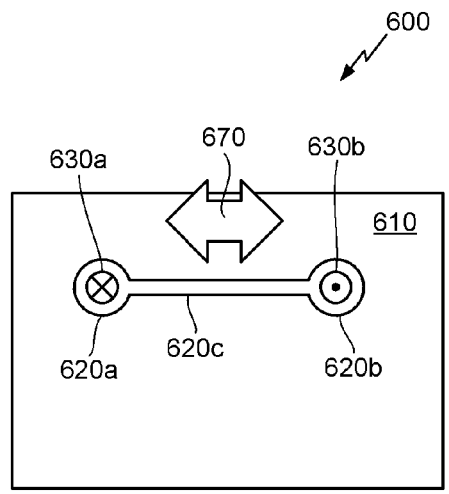
FIG. 11A         FIG. 11B
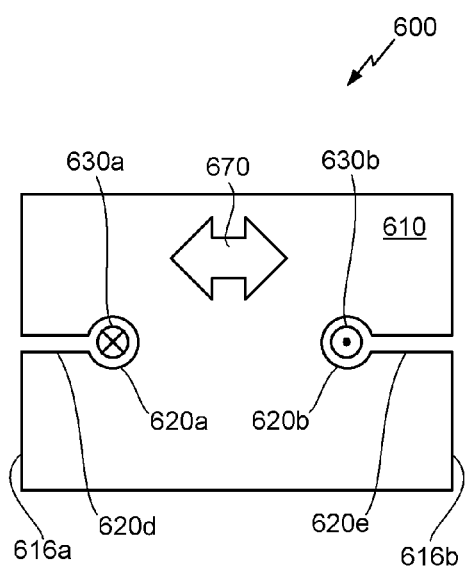
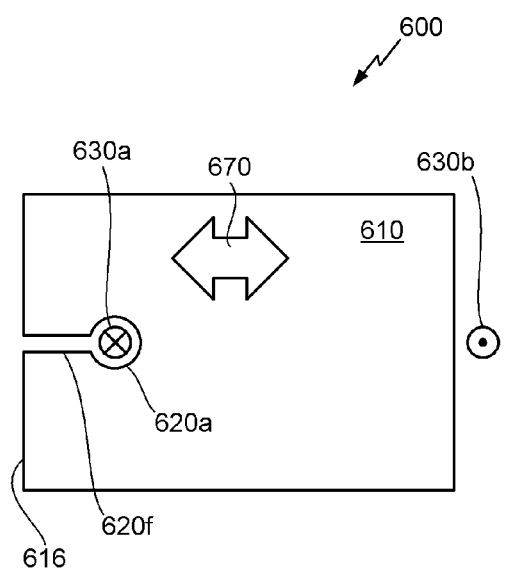
FIG. 11C         FIG. 11D

SYSTEM AND METHOD TO AVOID MAGNETIC POWER LOSS WHILE PROVIDING ALTERNATING CURRENT THROUGH A FERROMAGNETIC MATERIAL

RELATED APPLICATIONS

This application claims the benefit of priority to U.S. Provisional Appl. No. 61/913,775, filed Dec. 9, 2013 and incorporated in its entirety by reference herein.

FIELD

The present disclosure relates generally to wireless power transfer, and more specifically to devices, systems, and methods related to wireless power transfer to remote systems such as vehicles or electronic devices including batteries, and systems and methods of avoiding magnetic power loss in wireless power transfer systems.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an electrical device comprising a ferromagnetic material comprising at least one orifice. The electrical device further comprises at least one electrical conduit extending through the at least one orifice of the ferromagnetic material from a first region on a first side of the ferromagnetic material to a second region on a second side of the ferromagnetic material, the second side opposite to the first side. The at least one electrical conduit is configured to have at least one alternating current flowing along the at least one electrical conduit between the first region and the second region. The ferromagnetic material and the at least one electrical conduit are configured to reduce power loss within the ferromagnetic material caused by a circumferential magnetic flux generated within the ferromagnetic material by the at least one alternating current flowing along the at least one electrical conduit.

Another aspect of the disclosure provides a method of wirelessly transmitting or wirelessly receiving power. The method comprises conducting an alternating electrical current through at least one orifice extending through a ferromagnetic material from a first region on a first side of the ferromagnetic material to a second region on a second side of the ferromagnetic material. The second side is opposite to the first side. The ferromagnetic material and the at least one orifice are configured to reduce power loss within the ferromagnetic material caused by a circumferential magnetic flux generated within the ferromagnetic material by the alternating electrical current. The method further comprises wirelessly transmitting or wirelessly receiving power via a device comprising the ferromagnetic material.

Another aspect of the disclosure provides a method of fabricating an electrical device configured to wirelessly transmit or wirelessly receive power as part of a wireless power transfer system. The method comprises providing a ferromagnetic material comprising at least one orifice. The method further comprises extending at least one electrical conduit through the at least one orifice of the ferromagnetic material from a first region on a first side of the ferromagnetic material to a second region on a second side of the ferromagnetic material. The second side is opposite to the first side. The at least one electrical conduit is configured to have at least one alternating current flowing along the at least one electrical conduit between the first region and the second region. The ferromagnetic material and the at least one electrical conduit are configured to reduce power loss within the ferromagnetic material caused by a circumferential magnetic flux generated within the ferromagnetic material by the at least one alternating current flowing along the at least one electrical conduit.

Another aspect of the disclosure provides an electrical device of a wireless power transfer system. The device includes means for wirelessly transmitting or wirelessly receiving power comprising means for channeling magnetic flux, the means for channeling magnetic flux comprising at least one orifice. The device further includes means for conducting an alternating electrical current. The conducting means extends through the at least one orifice of the means for channeling magnetic flux from a first region of a first side of the means for channeling magnetic flux to a second region on a second side of the means for channeling magnetic flux, the second side opposite to the first side. The conducting means is configured to have at least one alternating current flowing along the conducting means between the first region and the second region. The means for channeling magnetic flux and the conducting means is configured to reduce power loss within the means for channeling magnetic flux caused by a circumferential magnetic flux generated within the means for channeling magnetic flux by the at least one alternating current flowing along the conducting means.

BRIEF DESCRIPTION OF THE DRAWINGS

FIGS. 11A-11D schematically illustrate example portions of an electronic device with preferred conductor and ferrite topology in accordance with certain embodiments described herein.

Figure 1:
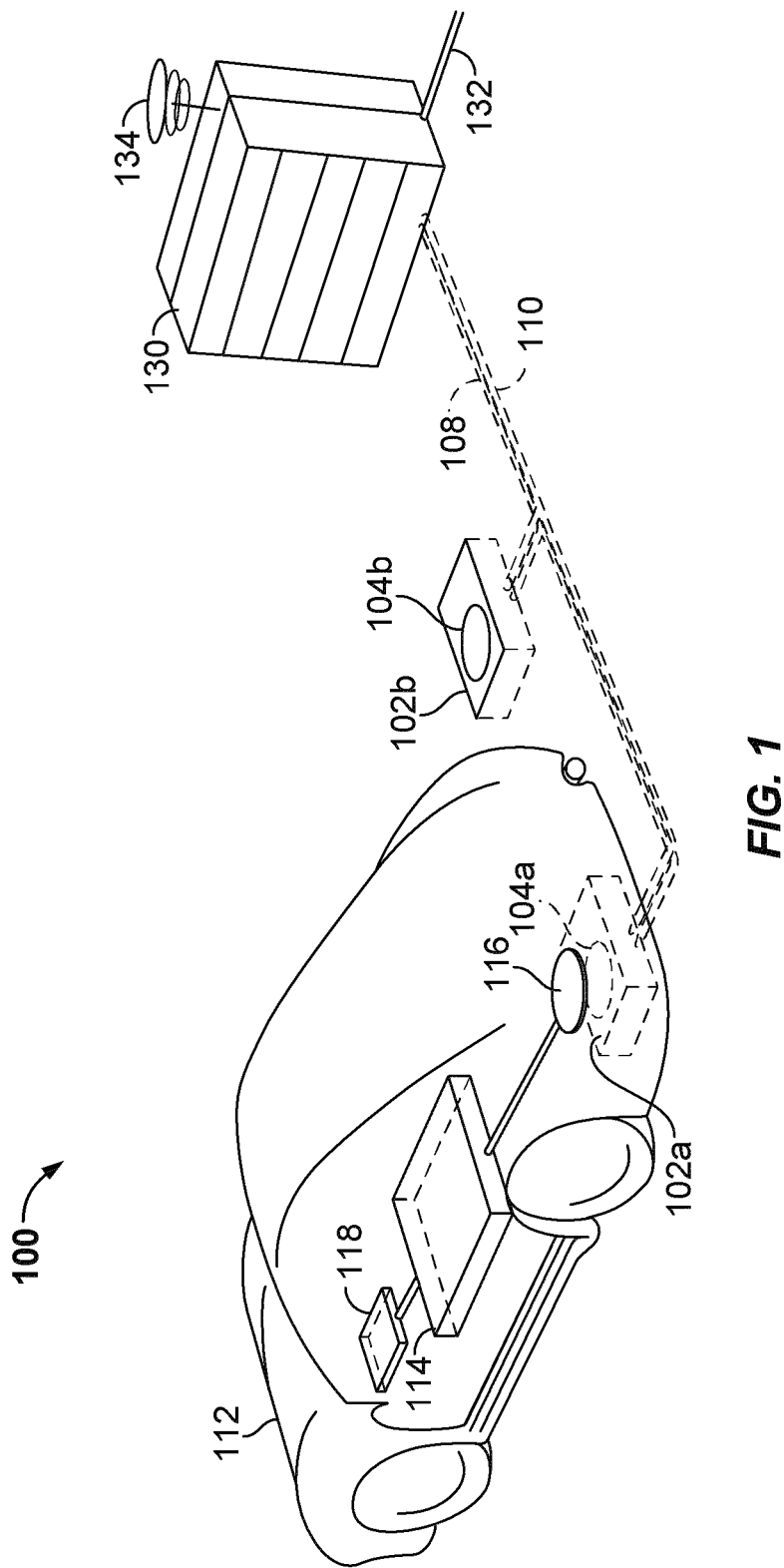
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of wavelength of the base system induction coil 104a (and vice versa for the electric vehicle induction coil 116) as will be further described below.

Local distribution 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
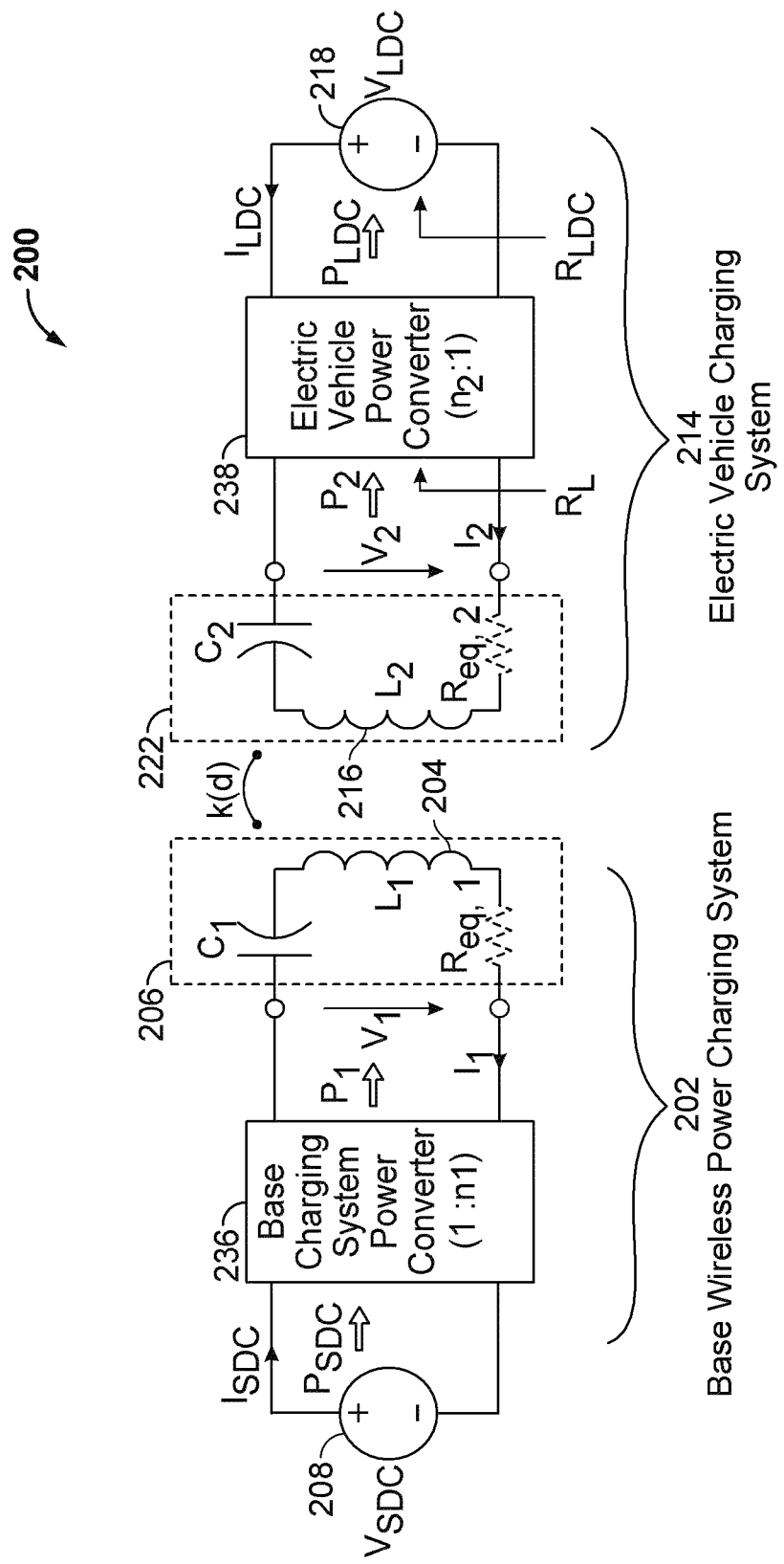
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
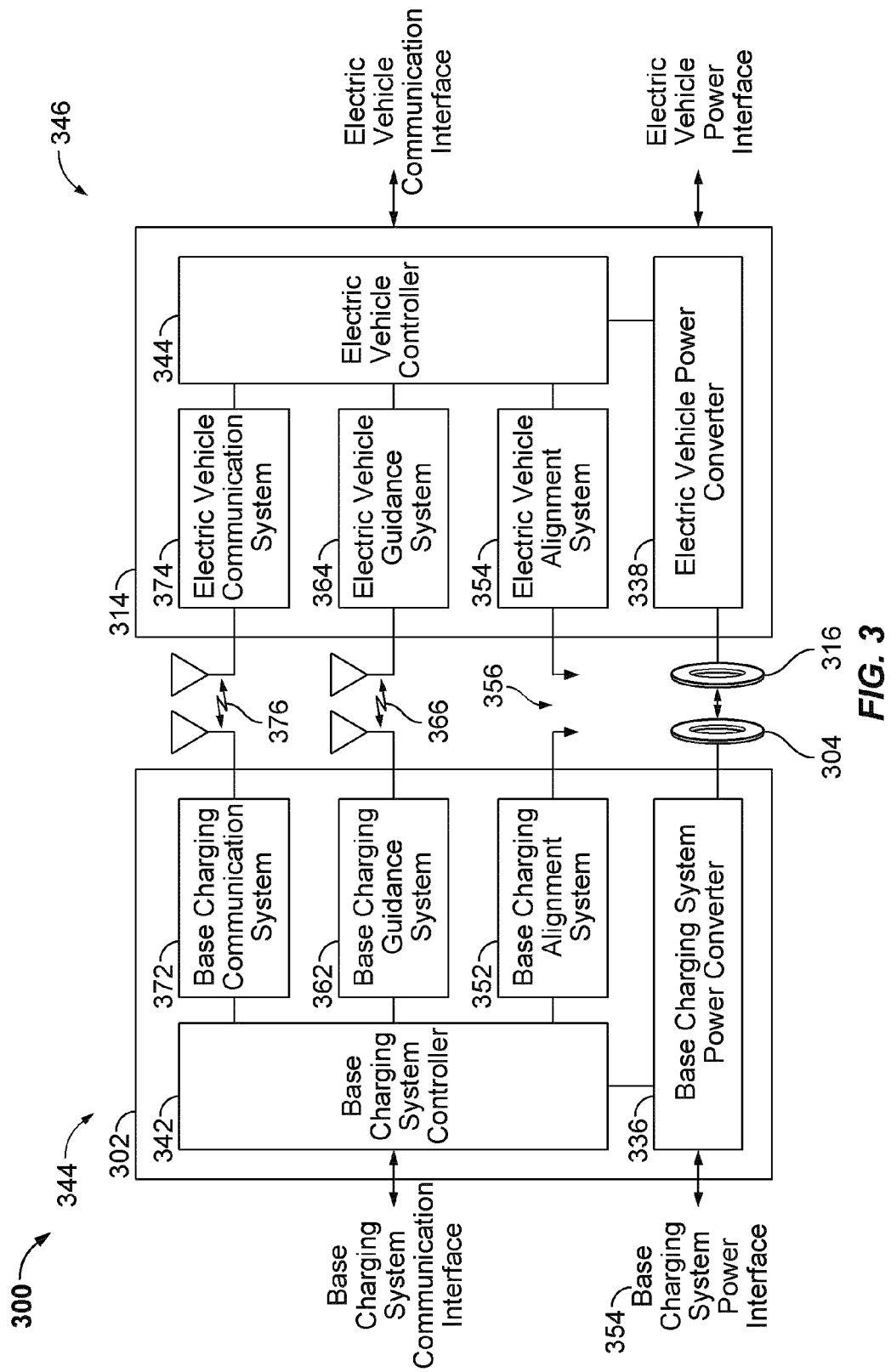
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 126. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104*a*. Detection of changes to the loading on the power amplifier may be monitored by the base charging system controller 342 for use in determining whether to enable the oscillator for transmitting energy, to communicate with an active receiver, or a combination thereof.

Figure 6:
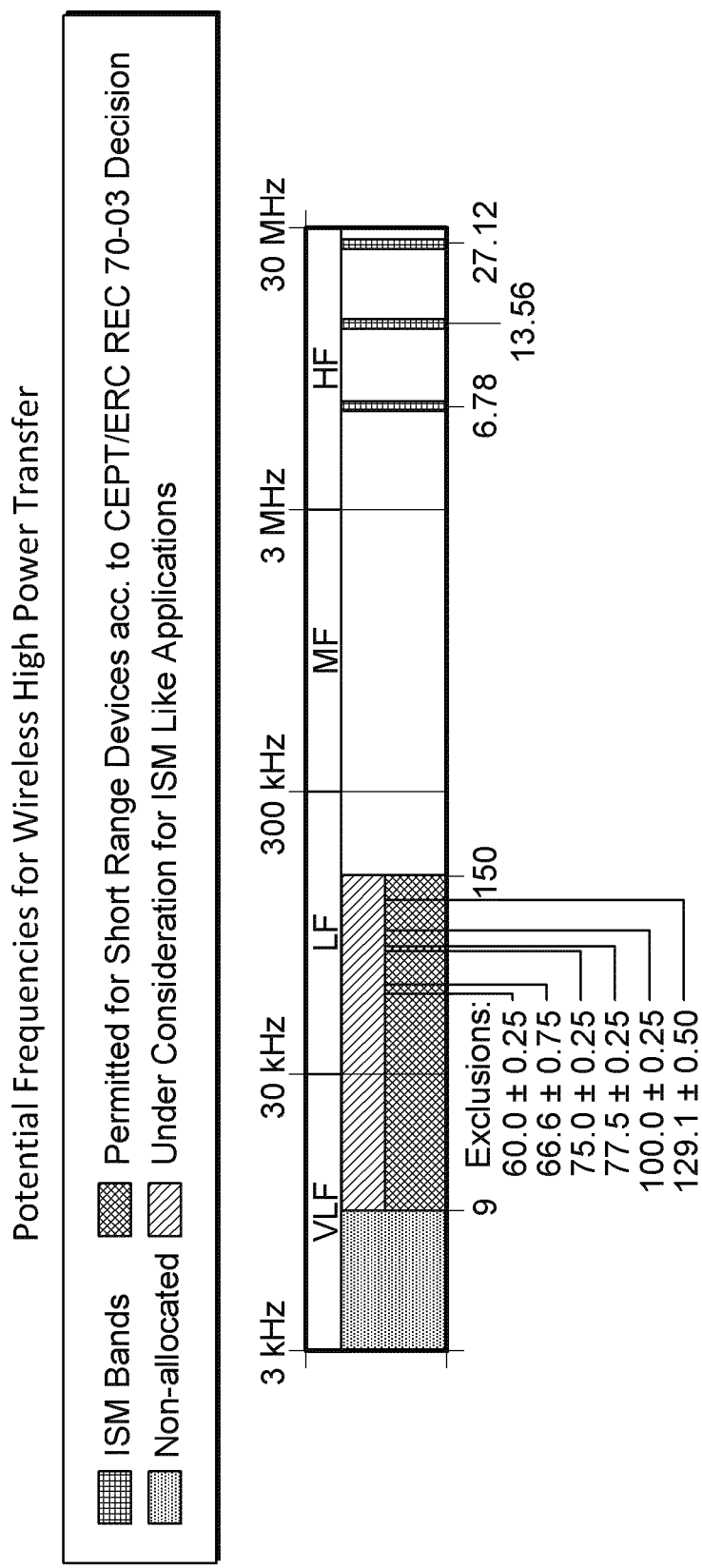
FIG. 6 is a chart of a frequency spectrum showing exemplary frequencies that may be available for wireless charging an electric vehicle, in accordance with an exemplary embodiment of the invention.

To enable wireless high power transfer, some embodiments may be configured to transfer power at a frequency in the range from 10-60 kHz or higher (see, e.g., FIG. 6). This low frequency coupling may allow highly efficient power conversion that may be achieved using solid state devices. In addition, there may be less coexistence issues with radio systems compared to other bands.

Figure 4:
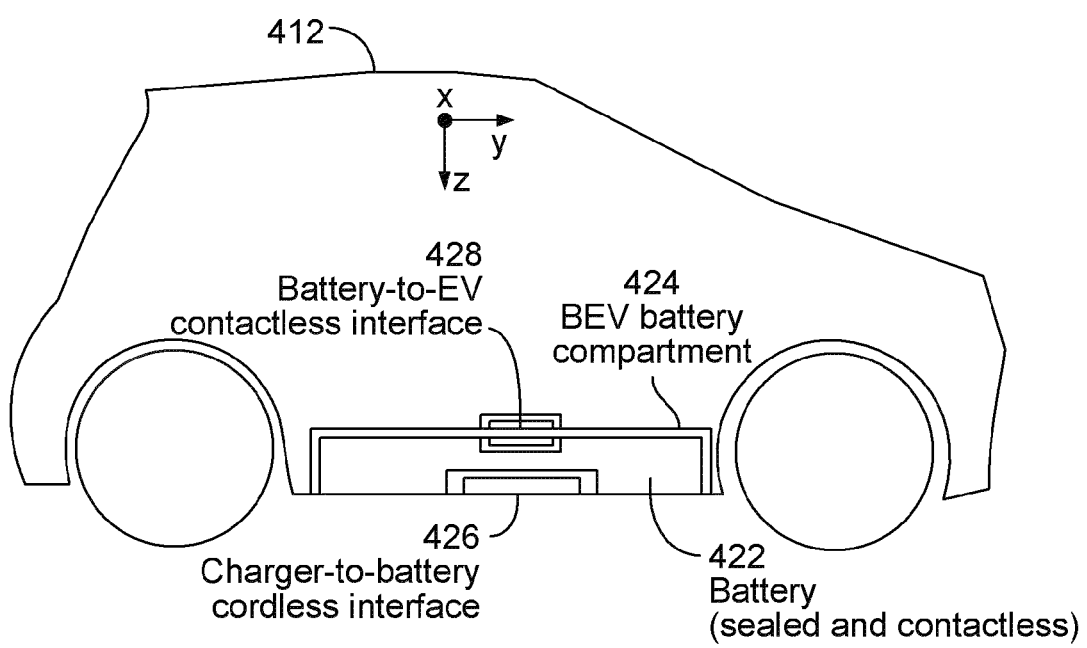
FIG. 4 is a functional block diagram showing a replaceable contactless battery disposed in an electric vehicle, in accordance with an exemplary embodiment of the invention.

The wireless power transfer system 100 described may be used with a variety of electric vehicles 102 including rechargeable or replaceable batteries. FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102*a* as shown in FIG. 1.

In some embodiments, and with reference to FIG. 1, the base system induction coil 104*a* and the electric vehicle induction coil 116 may be in a fixed position and the induction coils are brought within a near-field coupling region by overall placement of the electric vehicle induction coil 116 relative to the base wireless charging system 102*a*. However, in order to perform energy transfer rapidly, efficiently, and safely, the distance between the base system induction coil 104*a* and the electric vehicle induction coil 116 may need to be reduced to improve coupling. Thus, in some embodiments, the base system induction coil 104*a* and/or the electric vehicle induction coil 116 may be deployable and/or moveable to bring them into better alignment.

Figure 5A:
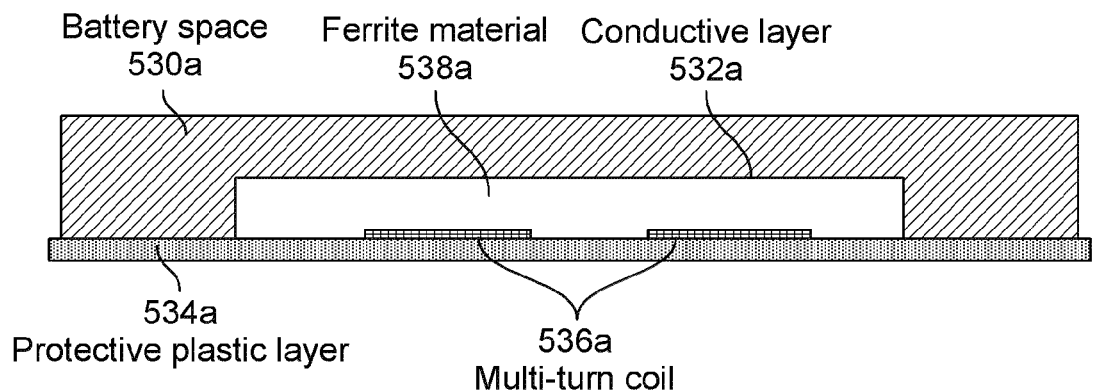
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536*a*. The wireless power induction coil may include a ferrite material 538*a* and a coil 536*a* wound about the ferrite material 538*a*. The coil 536*a* itself may be made of stranded Litz wire. A conductive shield 532*a* may be provided to protect passengers of the vehicle from excessive EMF transmission. Conductive shielding may be particularly useful in vehicles made of plastic or composites.

Figure 5B:
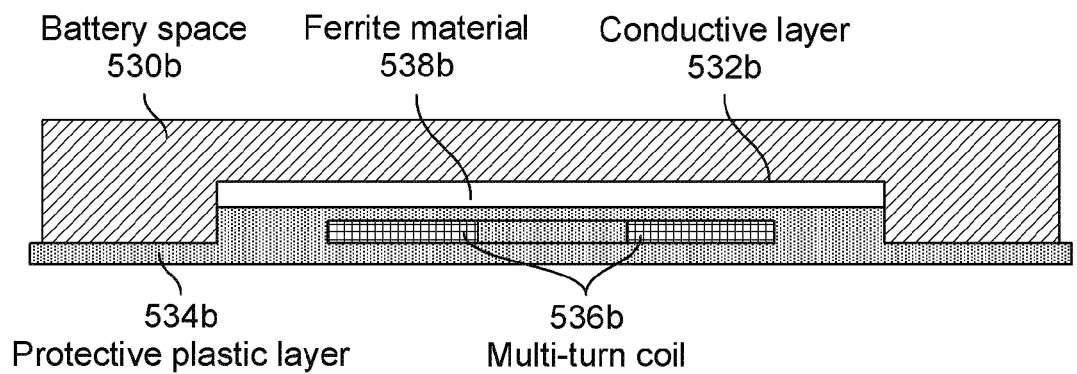

FIG. 5B shows an optimally dimensioned ferrite plate (i.e., ferrite backing) to enhance coupling and to reduce eddy currents (heat dissipation) in the conductive shield 532*b*. The coil 536*b* may be fully embedded in a non-conducting non-magnetic (e.g., plastic) material. For example, as illustrated in FIG. 5A-5D, the coil 536*b* may be embedded in a protective housing 534*b*. There may be a separation between the coil 536*b* and the ferrite material 538*b* as the result of a trade-off between magnetic coupling and ferrite hysteresis losses.

Figure 5C:
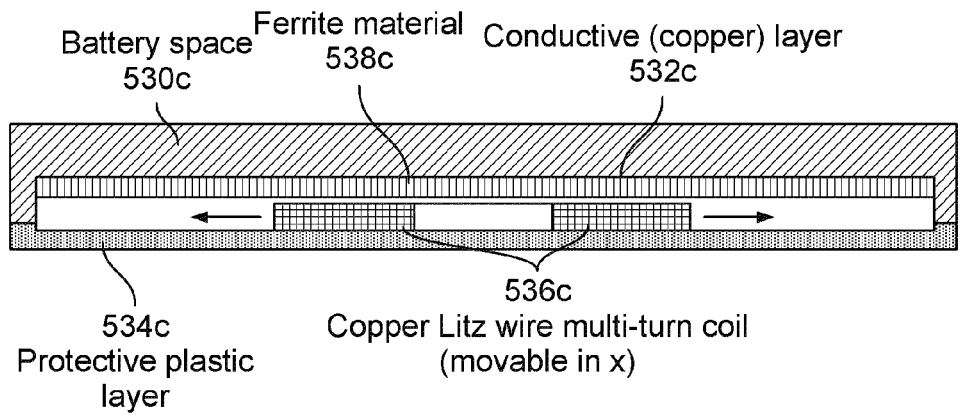
Figure 5D:
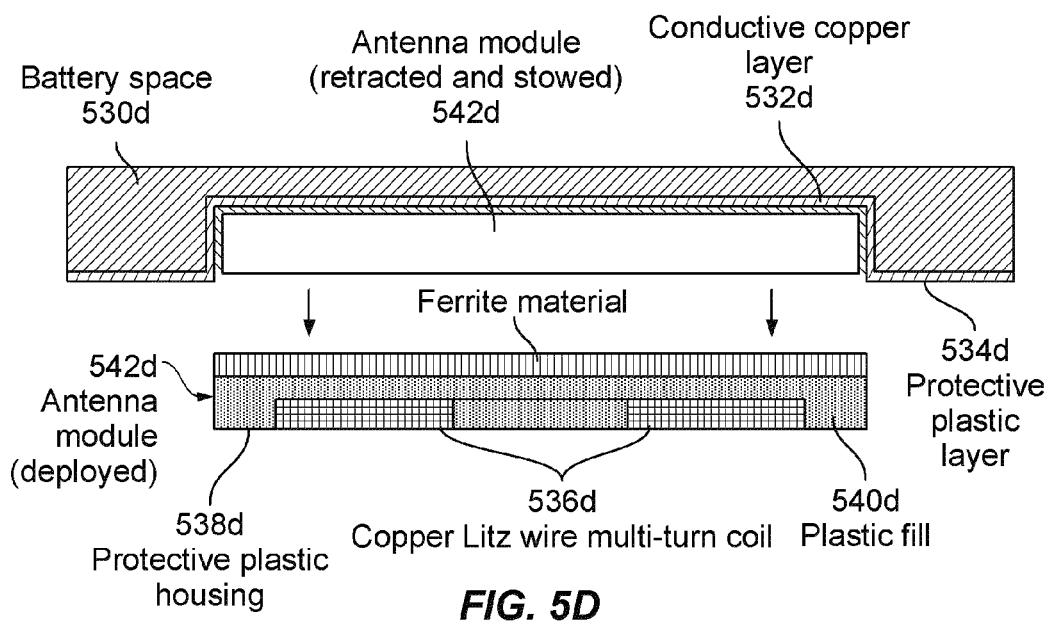

FIG. 5C illustrates another embodiment where the coil 536*c* (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 540*d* as part of the wireless power interface. To prevent magnetic fields from penetrating into the battery space 530*d* and into the interior of the vehicle, there may be a conductive shield 532*d* (e.g., a copper sheet) between the battery space 530*d* and the vehicle. Furthermore, a non-conductive (e.g., plastic) protective layer 533*d* may be used to protect the conductive shield 532*d*, the coil 536*d*, and the ferrite material 538*d* from environmental impacts (e.g., mechanical damage, oxidization, etc.). Furthermore, the coil 536*d* may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542b is similar to that of FIG. 5B except there is no conductive shielding at the electric vehicle induction coil module 542d. The conductive shield 532d stays with the battery unit body. The protective layer 533d (e.g., plastic layer) is provided between the conductive shield 432d and the electric vehicle induction coil module 542d when the electric vehicle induction coil module 542d is not in a deployed state. The physical separation of the electric vehicle induction coil module 542 from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

FIG. 6 is a chart of a frequency spectrum showing exemplary frequencies that may be used for wireless charging an electric vehicle, in accordance with an exemplary embodiment of the invention. As shown in FIG. 6, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
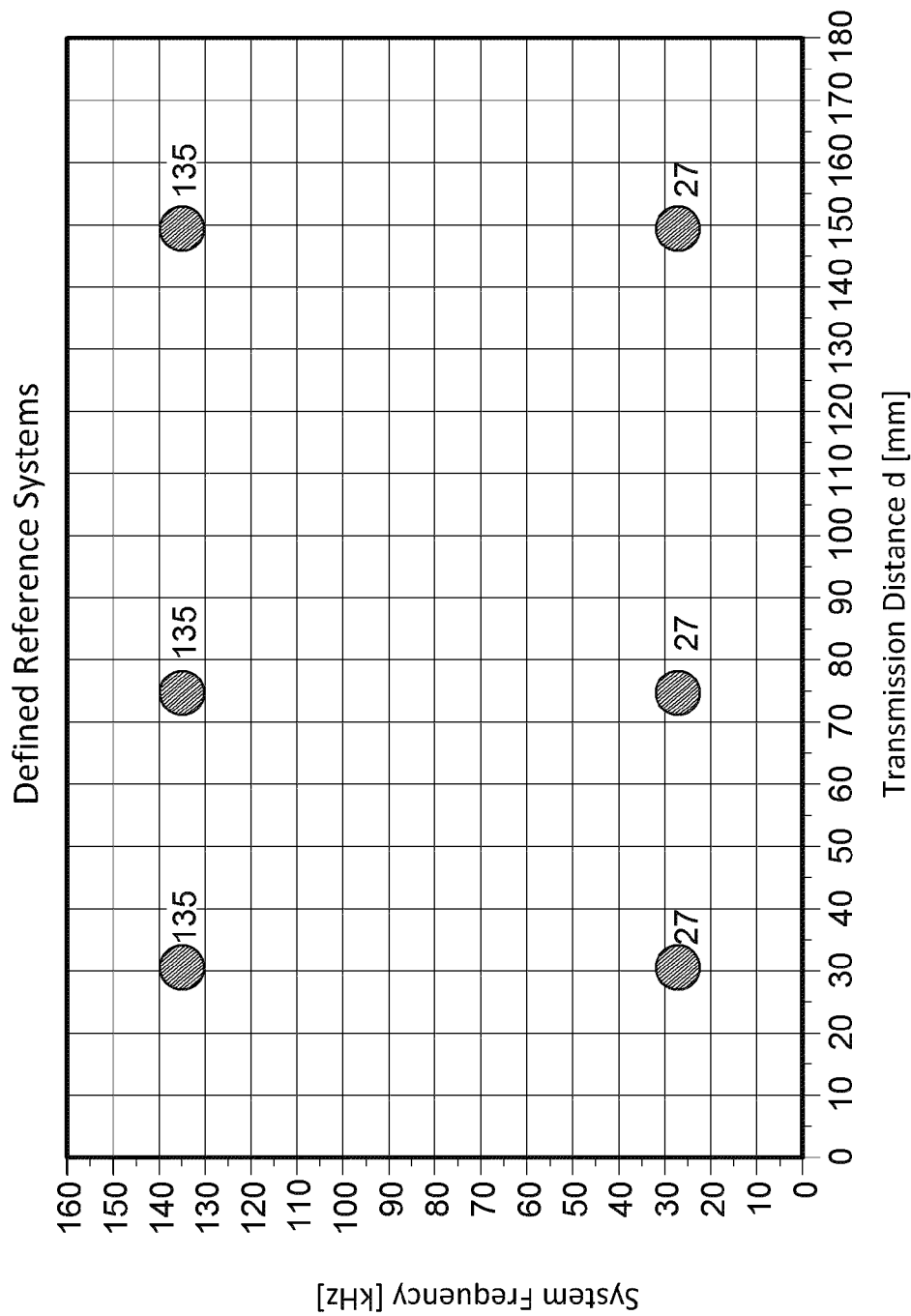
FIG. 7 is a chart showing exemplary frequencies and transmission distances that may be useful in wireless charging electric vehicles, in accordance with an exemplary embodiment of the invention.

FIG. 7 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

In certain configurations of the wireless power transfer system, alternating electrical current (AC) is supplied to or received from circuitry within the wireless transmitter (e.g., the base wireless charging system 302), the wireless receiver (e.g., the electric vehicle charging system 314), or both by way of electrical conduits (e.g., wires, cables, feedthroughs) extending through a housing of the wireless transmitter or the wireless receiver. In certain such configurations, these electrical conduits extend through at least a ferromagnetic portion of the wireless transmitter or the wireless receiver. For example, one or more electrical conduits can extend through the at least one of the ferrite material, ferrite plate, or ferrite backing of the wireless transmitter or the wireless receiver to provide electrical communication between internal circuitry and external circuitry. More generally, one or more electrical conduits can extend through at least a ferromagnetic portion (e.g., ferrite material) of an electronic device (e.g., actuators, wireless transmitter, wireless receiver) to connect the electronic device to an electronic system. Because of the high permeability of the ferrite material, the AC can generate significantly large circumferential flux densities in the ferrite material surrounding the electrical conduits, thereby significantly increasing the magnetic losses of the system. It is advantageous to reduce (e.g., prevent, avoid, minimize) such losses, which can also cause high temperature increases and thermal stresses to the system. In some cases a means for channeling magnetic flux can comprise a ferromagnetic material.

Figure 8A:
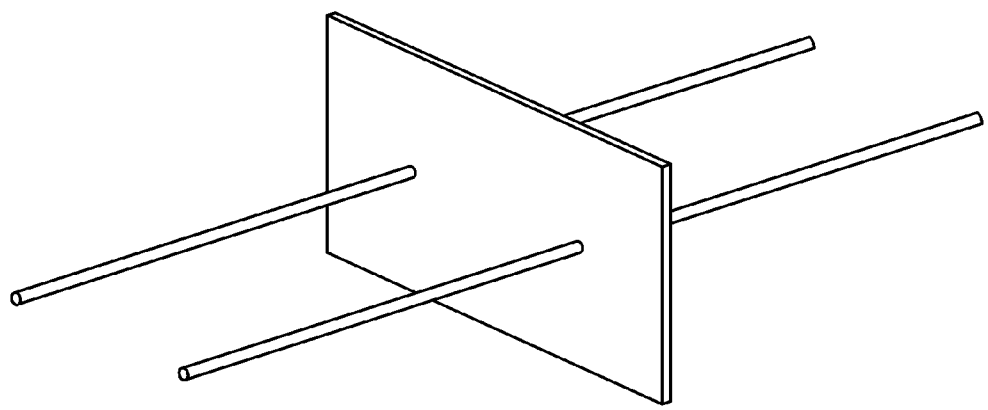
FIG. 8A schematically illustrates a model structure which was used to simulate a pair of electrical conduits (e.g., electrical conductor and return conductor, both in differential mode, with a 180 degree phase shift) extending through a ferrite plate.
Figure 8B:
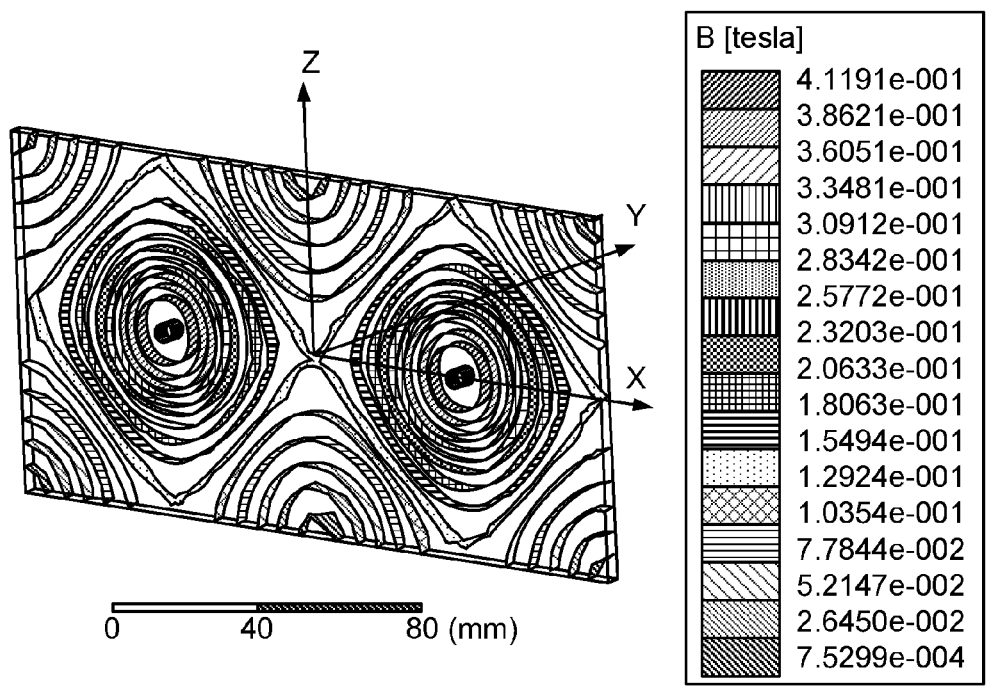
FIG. 8B illustrates the magnetic flux of this simulation.

FIG. 8A schematically illustrates a model structure which was used to simulate a pair of electrical conduits extending through a ferrite plate, and FIG. 8B illustrates the magnetic flux of this simulation. Electrical devices and components thereof (e.g., ferromagnetic material, at least one electrical conduit) are not limited in terms of the dimensions, magnetic fluxes, or other parameters which may be used in accordance with certain embodiments described herein. For example, the length scale, electrical currents, values of magnetic flux, and power loss as disclosed herein, e.g., as shown in FIG. 8B, are provided to show only some example relative magnitudes, and are not intended to limit the devices, systems, or methods described herein. The model structure includes a ferrite plate with two holes extending through the ferrite plate, each hole having a diameter. The model structure also includes two electrical conduits extending through the holes of the ferrite plate, each electrical conduit having a diameter and having an alternating current of 10 A flowing along it. The alternating current flowing through the two electrical conduits have opposite phases with respect to one another. The simulation shown in FIG. 8B shows the magnetic flux in the ferrite plate induced by the alternating current flowing through the two electrical conduits. The amount of power loss resulting in this model structure can be calculated (e.g., using the Steinmetz model) to be 18.3 W. The Steinmetz model is described in various references (e.g., "Modeling Magnetic Core Loss for Sinusoidal Waveforms," Master's Thesis of Colin J. Dunlop, Mass. Institute of Technology, June 2008).

The magnetic flux induced by the alternating current flowing through the two electrical conduits is fundamentally different from eddy currents that flow through a conductive material in proximity to an electrical current. For example, while the magnetic losses due to the magnetic flux are appreciable at higher frequencies of alternating electrical current, losses due to eddy currents are appreciable at both low frequencies (e.g., 50-60 Hz) as well as higher frequencies. In addition, while the magnetic flux rotates about direction of current flowing through the electrical conduits (e.g., as shown in FIG. 8B), eddy currents flow in a direction parallel to the direction of current flowing through the electrical conduits.

Figure 9:
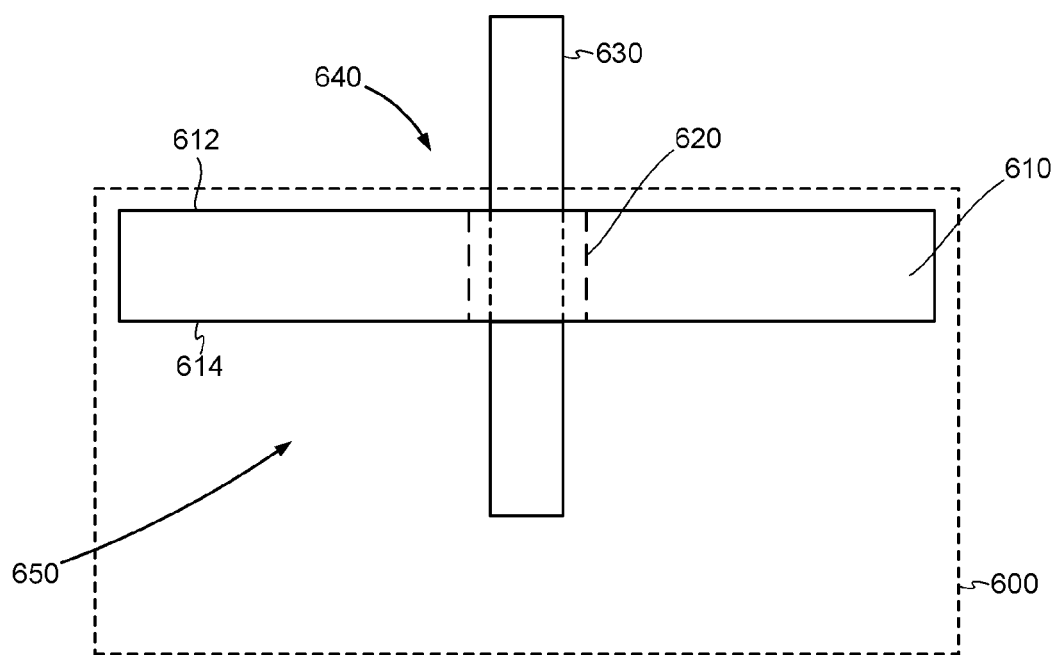
FIG. 9 schematically illustrates an example electrical device 600 in accordance with certain embodiments described herein.

FIG. 9 schematically illustrates an example electrical device 600 in accordance with certain embodiments described herein. The electrical device 600 is configured to wirelessly transmit or wirelessly receive power (e.g., as part of a wireless power transfer system 100 as described herein). Examples of such an electrical device 600 can comprise a wireless transmitter (e.g., a base wireless charging system 302), a wireless receiver (e.g., an electric vehicle charging system 314), or both.

The electrical device 600 comprises a ferromagnetic material 610 comprising at least one orifice 620 (e.g., hole, opening, region not comprising the ferromagnetic material 610). The electrical device 600 further comprises at least one electrical conduit 630 (e.g., an electrical cable, wire, feedthrough) extending through the at least one orifice 620 of the ferromagnetic material 610. For example, the at least one electrical conduit 630 can extend from a first region 640 on a first side 612 of the ferromagnetic material 610 to a second region 650 on a second side 614 of the ferromagnetic material 610, the second side 614 opposite to the first side 612 (e.g., the first region 640 can be outside the electrical device 600 and the second region 650 can be within the electrical device 600). The at least one electrical conduit 630 is configured to have at least one alternating current flowing along the at least one electrical conduit 630 between the first region 640 and the second region 650. In certain embodiments, the ferromagnetic material 610 and at least one electrical conduit 630 are configured to reduce (e.g., avoid, prevent, minimize) power losses due to a circumferential magnetic flux density generated within the ferromagnetic material 610 by the at least one alternating current flowing along the at least one electrical conduit 630. As described in more detail below, various configurations may be used to reduce (e.g., avoid, prevent, minimize) the power losses due to the circumferential magnetic flux density. Due to the differing directions of the circumferential magnetic flux density to any eddy currents generated by the alternating current flow, these configurations are different from configurations which are designed to reduce eddy current losses.

In certain embodiments, the at least one orifice 620 comprises an air gap (e.g., does not comprise solid material except the at least one electrical conduit 630). In certain other embodiments, the at least one orifice 620 comprises a material that does not support magnetic flux flowing through the material (e.g., a non-ferromagnetic material, example of which include, but are not limited to, plastic, ceramic, electrically conductive but non-ferromagnetic metals, alloys, or other solid materials). In certain embodiments, the at least one orifice 620 is configured to interrupt the unwanted magnetic flux that would otherwise form in the ferromagnetic material 610, thereby reducing (e.g., avoiding, preventing, minimizing) power losses due to the circumferential magnetic flux within the ferromagnetic material 610 by the at least one alternating current flowing along the at least one electrical conduit 630. For example, the at least one orifice 620 and the at least one electrical conduit 630 can be configured to interrupt the circumferential magnetic flux density within a plane of the ferromagnetic material 610 (e.g., ferrite plate). In contrast, a configuration designed to reduce eddy current losses would be designed to interrupt the eddy current flow in a direction parallel to the electrical conduits 630 in an electrically conductive material in proximity to the electrical conduits 630 (e.g., a direction perpendicular to an electrically conductive plate through which the electrical conduits 630 extend).

Figure 10:
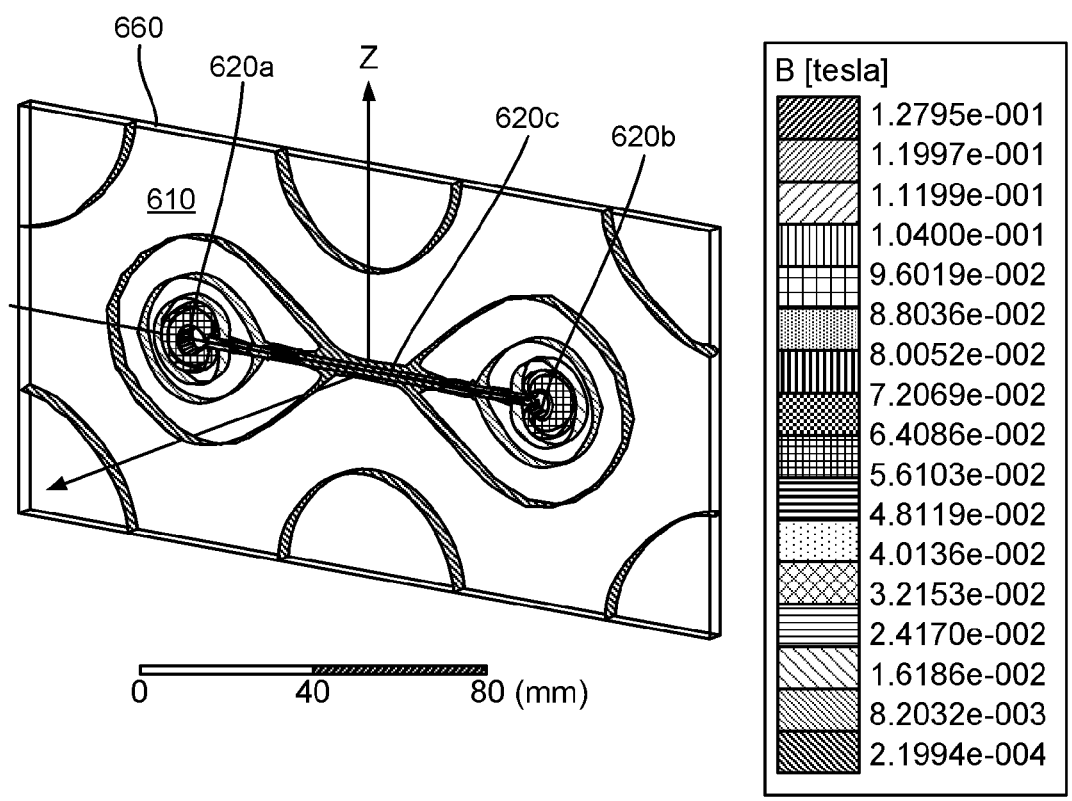
FIG. 10 illustrates the magnetic flux of a simulation in which the ferrite plate has a slice of material removed from the ferrite plate, the slice having a width of 1 mm and extending from one hole to the other.

FIG. 10 illustrates the magnetic flux density of an example simulation in which a ferrite plate 660 comprises the ferromagnetic material 610 and the at least one orifice 620. The at least one orifice 620 comprises a pair of holes 620a, 620b, each of which having an electrical conduit 630 extending therethrough (the electrical conduits 630 are not shown in FIG. 10). The at least one orifice 620 further comprises a region 620c that does not comprise the ferromagnetic material 610 (e.g., a slice of the ferrite plate 660 formed without the ferromagnetic material 610 or from which the ferromagnetic material 610 has been removed). The slice of FIG. 10 has an example width of 1 mm and extends from one hole 620a to the other hole 620b. In such a structure, the two holes 620a, 620b plus the region 620c (e.g., the slice) form a contiguous, unitary orifice 620 through the ferrite plate 660. As described more fully below, such a structure is in accordance with certain embodiments described herein. The example simulation shown in FIG. 10 shows the circumferential magnetic flux density in the ferrite plate 660 generated by the alternating current flowing through the two electrical conduits 630. The example amount of power loss resulting in this model structure can be calculated (e.g., using the Steinmetz model) to be 0.03 W.

FIGS. 11A-11D schematically illustrate example portions of an electronic device 600 in accordance with certain embodiments described herein. The double-headed arrow in each of FIGS. 11A-11D denotes a main magnetic flux direction 670 in the ferromagnetic material 610 (e.g., a direction of a magnetic flux that is used for the technical purpose of the device). For example, the main magnetic flux can be the magnetic flux used for the inductive power transfer (e.g., WEVC operation), which is different from the unwanted circumferential magnetic flux generated by the alternating current flowing along the electrical conduits 630a, 630b through the ferromagnetic material 610. In certain embodiments, the electrical conduits 630a, 630b and the at least one orifice 620 are configured to reduce (e.g., prevent, avoid, minimize) disruption of the main magnetic flux in the ferromagnetic material 610 (e.g., the main magnetic flux used in the wireless power transfer) while interrupting the circumferential magnetic flux generated within the ferromagnetic material 610 by the at least one alternating current flowing along the at least one electrical conduit 630.

For example, as shown in FIGS. 11A-11D, the electrical conduits 630a, 630b and the portions of the at least one orifice 620 between the electrical conduits 630a, 630b (e.g., the portion 620c of FIG. 11B) and/or between one of the electrical conduits 630a, 630b and an edge 616 of the ferromagnetic material 610 (e.g., the portions 620d, 620e of FIG. 11C and the portion 620f of FIG. 11D) can be aligned with the main magnetic flux direction 670 (e.g., the direction of the magnetic flux that is used in the wireless power transfer using the ferromagnetic material 610). Alternatively, the at least one orifice 620 can be formed in portions of the ferromagnetic material 610 in which the main magnetic flux is expected to be insignificantly influenced (e.g., in portions of the ferromagnetic material 610 that do not contribute appreciably to the operation of the device 600). In such portions, even if the at least one orifice 620 extends perpendicularly to the main magnetic flux direction 670, the power loss reduction in the ferromagnetic material 610 will be realized, without unduly influencing the wireless power transfer performance due to reduction of the magnetic coupling between transmitting and receiving coils.

In FIG. 11A, a first electrical conduit 630a (e.g., an input electrical cable) extends through the ferromagnetic material 610 (e.g., from a first region 640 on a first side 612 of the ferromagnetic material 610 to a second region 650 on a second side 614 of the ferromagnetic material 610, the second side 614 opposite to the first side 612) and a second electrical conduit 630b (e.g., an output electrical cable) extends through the ferromagnetic material 610 (e.g., from the first region 640 on the first side 612 of the ferromagnetic material 610 to the second region 650 on the second side 614 of the ferromagnetic material 610). For example, the first region 640 can be outside the electrical device 600 and the second region 650 can be within the electrical device 600. The first electrical conduit 630a carries a first alternating current flowing from the first region 640 to the second region 650 and the second electrical conduit carries a second alternating current flowing from the second region 650 to the first region 640. For example, the first alternating current and the second alternating current can both have opposite phases from one another and can both have the same magnitude. The ferromagnetic material 610 comprises an orifice 620 (e.g., a hole, opening, region not comprising the ferromagnetic material 610) that is larger than the sum of the diameters of the first and second electrical conduits 630a, 630b and that extends from the first side 612 of the ferromagnetic material 610 to the second side 614 of the ferromagnetic material 610. For example, the orifice 620 in FIG. 11A is generally rectangular and unitary, and is sufficiently large that both the first and second electrical conduits 630a, 630b fit within the orifice 620. Other shapes of the orifice 620 are also compatible with certain embodiments described herein, including but not limited to, circular, oval, square, triangular, and irregular. In the configuration of FIG. 11A, the contributions from the first and second electrical conduits 630a, 630b to the magnetic flux generated in the ferromagnetic material 610 cancel one another (e.g., completely, when the first and second alternating currents have the same magnitude and opposite phases), thereby reducing (e.g., avoiding, preventing, minimizing) power losses due to a circumferential magnetic flux as compared to configurations in which the first and second electrical conduits 630a, 630b are in separate orifices that are not configured to interrupt the circumferential magnetic flux.

For another example, as schematically shown in FIG. 11B, the orifice 620 can comprise a contiguous, unitary orifice (e.g., hole, opening, region not comprising the ferromagnetic material 610) that is formed by two first portions 620a, 620b (e.g., two generally circular portions, each of which contains one of the first electrical conduit 630a and the second electrical conduit 630b, and a second portion 620c (e.g., a generally straight linear portion) extending between the two first portions 620a, 620b. The second portion 620c of the orifice 620 can extend in a direction generally parallel to the main magnetic flux direction 670, and can formed by various techniques (e.g., cutting a slice in the ferromagnetic material 610, assembling different tiles of ferromagnetic material 610, which can be coupled together by a non-ferromagnetic material). The orifice 620 of FIG. 10 is a member of the class of orifices schematically illustrated by FIG. 11B. The second portion 620c of the orifice 620 can interrupt the magnetic path around each electrical conduit 630a, 630b to prevent a magnetic path from surrounding a single electrical conduit completely without surrounding the other electrical conduit. In this way, the magnetic fields of both electrical conduits 630a, 630b can cancel each other such that no additional magnetic flux is generated in the ferromagnetic material 610, thereby reducing power losses due to the circumferential magnetic flux in the ferromagnetic material 610. The second portion 620c of the orifice 620 can be formed by assembling standard ferrite blocks and leaving an air gap or non-ferromagnetic material between the electrical conduits 630a, 630b or by machining the second portion 620c of the orifice 620 in a single ferrite structure. Both the orifice 620 of FIG. 11A and the orifice 620 of FIG. 11B have the common attribute of being a contiguous, unitary orifice 620 that contains both the first electrical conduit 630a and the second electrical conduit 630b.

In FIG. 11C, a first electrical conduit 630a extends through the ferromagnetic material 610 (e.g., from a first region 640 on a first side 612 of the ferromagnetic material 610 to a second region 650 on a second side 614 of the ferromagnetic material 610, the second side 614 opposite to the first side 612) and a second electrical conduit 630b extends through the ferromagnetic material 610 (e.g., from the first region 640 on the first side 612 of the ferromagnetic material 610 to the second region 650 on the second side 614 of the ferromagnetic material 610). The first electrical conduit 630a carries a first alternating current flowing from the first region 640 to the second region 650 and the second electrical conduit 630b carries a second alternating current flowing from the second region 650 to the first region 640. For example, the first alternating current and the second alternating current can both have opposite phases from one another and can have the same magnitude. The ferromagnetic material 610 comprises a first orifice 620a, 620d (e.g., a hole, opening, region not comprising the ferromagnetic material 610) that contains the first electrical conduit 630a and a second orifice 620b, 620e (e.g., a hole, opening, region not comprising the ferromagnetic material 610) that contains the second electrical conduit 630b. Each of the first orifice 620a, 620d and the second orifice 620b, 620e extends from the first side 612 of the ferromagnetic material 610 to the second side 614 of the ferromagnetic material 610, and each of the first orifice 620a, 620d and the second orifice 620b, 620e extends across the ferromagnetic material 610 between the electrical conduit 630 contained in the orifice 620 to an edge 616 of the ferromagnetic material 610 (e.g., a slice between the outer edge of the ferromagnetic material 610 and the hole containing the electrical conduit).

For example, as schematically illustrated by FIG. 11C, the first orifice 620a, 620d comprises a first portion 620a that contains the first electrical conduit 630a and a second portion 620d that extends from the first portion 620a to a first edge 616a of the ferromagnetic material. The second portion 620d of the first orifice 620a, 620d can extend in a direction generally parallel to the main magnetic flux direction 670. The second orifice 620b, 620e comprises a first portion 620b that contains the second electrical conduit 630b and a second portion 620e that extends to a second edge 616b of the ferromagnetic material 610. The second portion 620e of the second orifice 620b, 620e can extend in a direction generally parallel to the main magnetic flux direction 670. In certain embodiments, the first edge 616a and the second edge 616b are different from one another (e.g., opposite edges of the ferromagnetic material 610). The second portion 620d of the first orifice 620a, 620d and/or the second portion 620e of the second orifice 620b, 620e can be formed by assembling standard ferrite blocks and leaving an air gap or non-ferromagnetic material between the electrical conduits 630 and the edges 616a, 616b or by machining the second portion 620d of the first orifice 620a, 620d and/or the second portion 620e of the second orifice 620b, 620e in a single ferrite structure.

In FIG. 11D, a first electrical conduit 630A extends through the ferromagnetic material 610 (e.g., from a first region 640 on a first side 612 of the ferromagnetic material 610 to a second region 650 on a second side 614 of the ferromagnetic material 610, the second side 614 opposite to the first side 612) and a second electrical conduit 630b does not extend through the ferromagnetic material 610 (e.g., does not cross the ferromagnetic material 610) but does extend from the first region 640 on the first side 612 of the ferromagnetic material 610 to the second region 650 on the second side 614 of the ferromagnetic material 610. The first electrical conduit 630a carries a first alternating current flowing from the first region 640 to the second region 650 and the second electrical conduit 630b carries a second alternating current flowing from the second region 650 to the first region 640. For example, the first alternating current and the second alternating current can both have opposite phases from one another and can have the same magnitude. The ferromagnetic material 610 comprises an orifice 620a, 620f that contains the first electrical conduit 630a. The orifice 620a, 620f extends from the first side 612 of the ferromagnetic material 610 to the second side 614 of the ferromagnetic material 610. The orifice 620a, 620f extends across the ferromagnetic material 610 between the first electrical conduit 630a to an edge 616 of the ferromagnetic material 610.

For example, as schematically illustrated by FIG. 11D, the orifice 620a, 620f comprises a first portion 620a that contains the first electrical conduit 630a and a second portion 620f that extends from the first portion 620a to an edge 616 of the ferromagnetic material 610. The second portion 620f of the orifice 620a, 620f can extend in a direction generally parallel to the main magnetic flux direction 670. The second portion 620f of the orifice 620a, 620f can be formed by assembling standard ferrite blocks and leaving an air gap or non-ferromagnetic material between the electrical conduit 620a and the edge 616 or by machining the second portion 620f of the orifice 620a, 620f in a single ferrite structure.

The first orifice 620a, 620d containing the first electrical conduit 630a of FIG. 11C, the second orifice 620b, 620e containing the second electrical conduit 630b of FIG. 11C, and the orifice 620a, 620f containing the first electrical conduit 630a of FIG. 11D all share the same attribute of being configured such that the ferromagnetic material 610 does not completely surround the electrical conduit 630 contained therein. This attribute can be viewed as being analogous to having the electrical conduit 630 outside of the ferromagnetic material 610 (e.g., analogous to the positioning of the second electrical conduit 630b of FIG. 11D outside of the ferromagnetic material 610).

Figure 12:
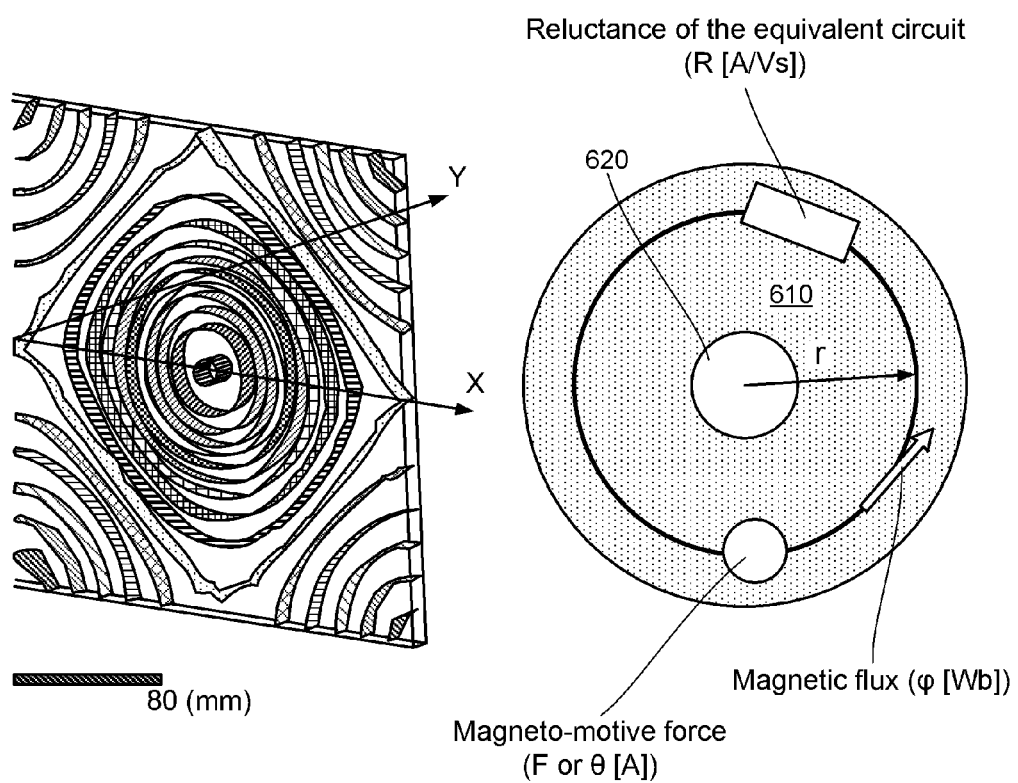
FIG. 12 schematically illustrates an equivalent magnetic circuit for a simplified structure.

FIG. 12 schematically illustrates an equivalent magnetic circuit calculation for a simplified structure. The right-side of FIG. 12 shows a simplified structure in which an electrical conduit 630 (not shown) extends through an orifice 620 (denoted by the white central circle) through a ferromagnetic material 610 (denoted by the shaded circle). The alternating current flowing through the electrical conduit 630 generates a magnetic flux $\phi$ within the ferromagnetic material 610 (denoted by arrow). The left side of FIG. 12 shows the iso-surfaces of the magnetic flux density for the simplified structure of the right-side of FIG. 12. An equivalent magnetic circuit (denoted by the circular line having a radius r) can be created comprising a reluctance of the equivalent circuit (denoted by a rectangle superimposed on the circular line) and a magneto-motive force (denoted by the small white circle superimposed on the circular line). This magnetic circuit can be thought of as being analogous to an electrical circuit, but with the reluctance in place of a resistor, the magneto-motive force in place of a battery (or electromotive force), and the magnetic flux in place of an electrical current.

According to the Steinmetz model, the losses in a ferromagnetic (e.g., ferrite) material 610 are proportional to the magnetic flux density raised to a power in a range from two to three. Thus, by reducing the magnetic flux density by a factor of 5, the losses can be decreased by at least a factor of 25. Furthermore, the magnetic flux $\phi$, as well as the magnetic flux density, is proportional to the inverse of the reluctance (1/R) in an ideal equivalent circuit, as shown in FIG. 12. Thus, to achieve a reduction of the losses by at least a factor of 25 using a modification of the orifice 620 (as compared to the ferromagnetic material 610 without further modification of the orifice 620), in certain embodiments, the modification of the orifice 620 (e.g., the portion of the orifice 620 configured to interrupt the magnetic flux in the ferromagnetic material 610) is wide enough to increase the magnetic reluctance of a comparable magnetic circuit around a single electrical conduit by at least a factor of five.

For example, if the modification of the orifice 620 comprises an addition of a slice through the ferromagnetic material 610, the following equation can be instructive for selecting a width of the slice ($l_{slice}$):

$$R_{ferrite} + R_{slice} = 5 * R_{ferrite_{without_{slice}}} \rightarrow \frac{l_{ferrite}}{\mu_0 \mu_r A} * 5 = \frac{l_{ferrite} - l_{slice}}{\mu_0 \mu_r A} + \frac{l_{slice}}{\mu_0 A}$$

This equation can be reduced to show that $l_{slice} = 0.004 * l_{ferrite}$. Assuming an $r_{mean} = 25$ mm, the width of the slice ($l_{slice}$) that yields a reduction of the losses by at least a factor of 25 can be 0.63 mm. In practice, due to nonlinear field behavior, slices of even smaller widths can achieve the desired increase in reluctance and the concomitant reduction in loss.

Figure 13:
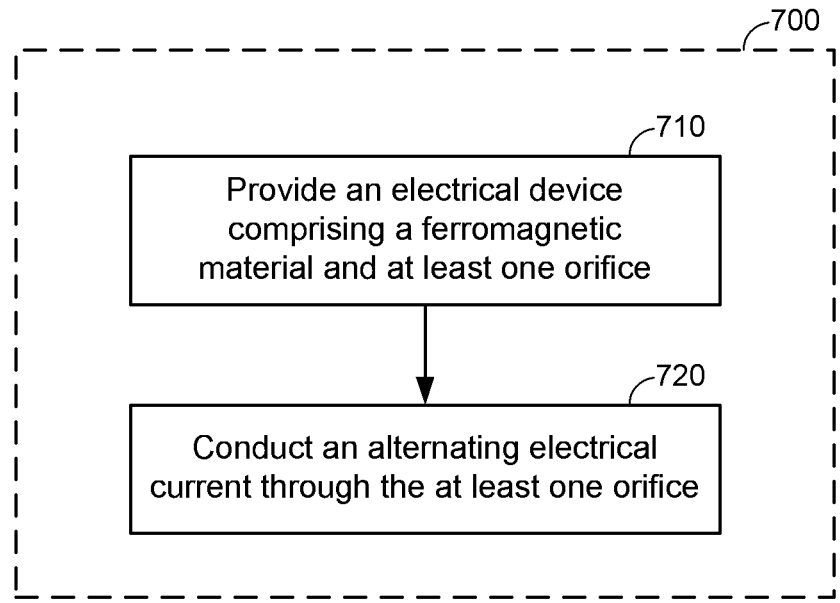
FIG. 13 is a flow diagram of an example method of wirelessly transmitting or wirelessly receiving power in accordance with certain embodiments described herein.

FIG. 13 is a flow diagram of an example method 700 of wirelessly transmitting or wirelessly receiving power in accordance with certain embodiments described herein. In an operational block 710, the method 700 comprises providing an electrical device 600 of a wireless power transfer system. The device 600 comprises a ferromagnetic material 610 and at least one orifice 620 extending through the ferromagnetic material 610. In an operational block 720, the method 700 further comprises conducting an alternating electrical current through the at least one orifice 620 from a first region 640 on a first side 612 of the ferromagnetic material 610 to a second region 650 on a second side 614 of the ferromagnetic material 610. The second side 614 is opposite to the first side 612. The ferromagnetic material 610 and at least one orifice 620 are configured to reduce power loss within the ferromagnetic material 610 caused by a circumferential magnetic flux generated within the ferromagnetic material 610 by the alternating electrical current.

Figure 14:
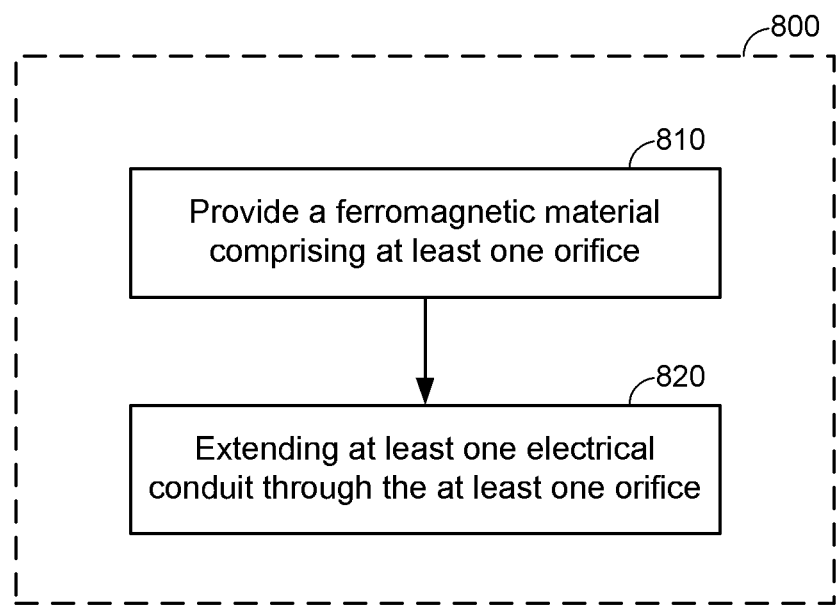
FIG. 14 is a flow diagram of an example method of fabricating an electrical device configured to wirelessly transmit or wirelessly receive power as part of a wireless power transfer system.

FIG. 14 is a flow diagram of an example method 800 of fabricating an electrical device 600 configured to wirelessly transmit or wirelessly receive power as part of a wireless power transfer system. In an operational block 810, the method 800 comprises providing a ferromagnetic material 610 comprising at least one orifice 620. In an operational block 820, the method 800 further comprises extending at least one electrical conduit 630 through the at least one orifice 620 of the ferromagnetic material 610 from a first region 640 on a first side 612 of the ferromagnetic material 610 to a second region 650 on a second side 614 of the ferromagnetic material 610. The second side 614 is opposite to the first side 612. The at least one electrical conduit 630 is configured to have at least one alternating current flowing along the at least one electrical conduit 630 between the first region 640 and the second region 650. The ferromagnetic material 610 and at least one electrical conduit 630 are configured to reduce power loss within the ferromagnetic material 610 caused by a circumferential magnetic flux generated within the ferromagnetic material 610 by the at least one alternating current flowing along the at least one electrical conduit 630.

For example, providing the ferromagnetic material 610 can comprise cutting the at least one orifice 620 in a portion of the ferromagnetic material 610. For another example, providing the ferromagnetic material can comprise assembling tiles of the ferromagnetic material 610 and mechanically coupling the tiles together by a non-ferromagnetic material. In certain embodiments, the at least one orifice 620 comprises a non-ferromagnetic material.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for wirelessly transmitting power may comprise a wireless power transmitter and means for wirelessly receiving power may comprise a wireless power receiver. In addition, a means for channeling magnetic flux may comprise a ferromagnetic material. In addition, means for conducting an alternating electrical current may comprise an electric conduit. Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An electrical device configured to wirelessly transmit or wirelessly receive power as part of a wireless power transfer system, the electrical device comprising:

a ferromagnetic material comprising at least one orifice;

at least one electrical conduit extending through the at least one orifice of the ferromagnetic material from a first region on a first side of the ferromagnetic material to a second region on a second side of the ferromagnetic material, the second side opposite to the first side, the at least one electrical conduit configured to have at least one alternating current flowing along the at least one electrical conduit between the first region and the second region, the ferromagnetic material and the at least one electrical conduit configured to reduce power loss within the ferromagnetic material caused by a circumferential magnetic flux generated within the ferromagnetic material by the at least one alternating current, wherein the at least one orifice interrupts the generated circumferential magnetic flux in the ferromagnetic material by the at least one alternating current flowing along the at least one electrical conduit.

2. The electrical device of claim 1, wherein the electrical device comprises a wireless transmitter, a wireless receiver, or both.

3. The electrical device of claim 1, wherein the at least one orifice comprises an air gap.

4. The electrical device of claim 1, wherein the at least one orifice comprises a non-ferromagnetic material.

5. The electrical device of claim 1, wherein the at least one electrical conduit and the at least one orifice are configured to reduce disruption of a main magnetic flux in the ferromagnetic material while interrupting the circumferential magnetic flux within the ferromagnetic material generated by the at least one alternating current flowing along the at least one electrical conduit.

6. The electrical device of claim 5, wherein at least one portion of the at least one orifice is aligned with a direction of the main magnetic flux direction.

7. The electrical device of claim 5, wherein the at least one orifice is formed in a portion of the ferromagnetic material that does not contribute appreciably to the operation of the electronic device.

8. The electrical device of claim 1, wherein the at least one electrical conduit comprises:
a first electrical conduit that extends through the ferromagnetic material from the first region on the first side of the ferromagnetic material to the second region on the second side of the ferromagnetic material, the first electrical conduit configured to carry a first alternating current flowing from the first region to the second region; and
a second electrical conduit that extends through the ferromagnetic material from the first region on the first side of the ferromagnetic material to the second region on the second side of the ferromagnetic material, the second electrical conduit configured to carry a second alternating current flowing from the second region to the first region.

9. The electrical device of claim 8, wherein the first alternating current and the second alternating current have opposite phases from one another and have the same magnitude.

10. The electrical device of claim 8, wherein the first electrical conduit and the second electrical conduit both extend through a contiguous, unitary orifice of the at least one orifice.

11. The electrical device of claim 10, wherein the contiguous, unitary orifice comprises two first portions each of which contains one of the first electrical conduit and the second electrical conduit, and a second portion extending between the two first portions.

12. The electrical device of claim 11, wherein the second portion of the orifice is generally straight and extends in a direction generally parallel to a main magnetic flux direction.

13. The electrical device of claim 8, wherein the at least one orifice comprises a first orifice containing the first electrical conduit and a second orifice containing the second electrical conduit, each of the first orifice and the second orifice extending across the ferromagnetic material between the corresponding electrical conduit contained therein to an edge of the ferromagnetic material.

14. The electrical device of claim 13, wherein the first orifice, the second orifice, or both comprises a slice between the outer edge of the ferromagnetic material and the electrical conduit.

15. The electrical device of claim 13, wherein the first orifice comprises a first portion that contains the first electrical conduit and a second portion that extends from the first portion to a first edge of the ferromagnetic material.

16. The electrical device of claim 15, wherein the second portion of the first orifice extends in a direction generally parallel to a main magnetic flux direction.

17. The electrical device of claim 15, wherein the second orifice comprises a first portion that contains the second electrical conduit and a second portion that extends to a second edge of the ferromagnetic material.

18. The electrical device of claim 17, wherein the second portion of the second orifice extends in a direction generally parallel to a main magnetic flux direction.

19. The electrical device of claim 17, wherein the first edge and the second edge are different from one another.

20. The electrical device of claim 1, wherein the at least one electrical conduit comprises a first electrical conduit extending through the ferromagnetic material from the first region on the first side of the ferromagnetic material to the second region on the second side of the ferromagnetic material, the second side opposite to the first side, the first electrical conduit configured to carry a first alternating current flowing from the first region to the second region, and the electrical device comprises a second electrical conduit that does not extend through the ferromagnetic material but does extend from the first region on the first side of the ferromagnetic material to the second region on the second side of the ferromagnetic material, the second electrical conduit configured to carry a second alternating current flowing from the second region to the first region.

21. The electrical device of claim 20, wherein the at least one orifice comprises an orifice that contains the first electrical conduit, the orifice extending across the ferromagnetic material between the first electrical conduit to an edge of the ferromagnetic material.

22. The electrical device of claim 21, wherein the orifice comprises a first portion that contains the first electrical conduit and a second portion that extends from the first portion to an edge of the ferromagnetic material.

23. The electrical device of claim 22, wherein the second portion of the orifice extends in a direction generally parallel to a main magnetic flux direction.

24. A method of wirelessly transmitting or wirelessly receiving power, the method comprising:
conducting an alternating electrical current through at least one orifice extending through a ferromagnetic material from a first region on a first side of the ferromagnetic material to a second region on a second side of the ferromagnetic material, the second side opposite to the first side, the ferromagnetic material and the at least one orifice configured to reduce power loss within the ferromagnetic material caused by a circumferential magnetic flux generated within the ferromagnetic material by the alternating electrical current, wherein the at least one orifice interrupts the circumferential magnetic flux generated within the ferromagnetic material by the alternating electrical current; and wirelessly transmitting or wirelessly receiving power via a device comprising the ferromagnetic material.

25. A method of fabricating an electrical device configured to wirelessly transmit or wirelessly receive power as part of a wireless power transfer system, the method comprising:

providing a ferromagnetic material comprising at least one orifice; and extending at least one electrical conduit through the at least one orifice of the ferromagnetic material from a first region on a first side of the ferromagnetic material to a second region on a second side of the ferromagnetic material, the second side opposite to the first side, the at least one electrical conduit configured to have at least one alternating current flowing along the at least one electrical conduit between the first region and the second region, the ferromagnetic material and the at least one electrical conduit configured to reduce power loss within the ferromagnetic material caused by a circumferential magnetic flux generated within the ferromagnetic material by the at least one alternating current, wherein the at least one orifice interrupts the circumferential magnetic flux generated within the ferromagnetic material by the at least one alternating current flowing along the at least one electrical conduit.

26. The method of claim 25, wherein providing the ferromagnetic material comprises cutting the at least one orifice in a portion of the ferromagnetic material.

27. The method of claim 25, wherein providing the ferromagnetic material comprises assembling tiles of the ferromagnetic material and mechanically coupling the tiles together by a non-ferromagnetic material.

28. The method of claim 25, wherein the at least one orifice comprises a non-ferromagnetic material.

29. An electrical device of a wireless power transfer system, the device comprising:

means for wirelessly transmitting or wirelessly receiving power comprising means for channeling magnetic flux, the means for channeling magnetic flux comprising at least one orifice; and means for conducting an alternating electrical current, the conducting means extending through the at least one orifice of the means for channeling magnetic flux from a first region of a first side of the means for channeling magnetic flux to a second region on a second side of the means for channeling magnetic flux, the second side opposite to the first side, the conducting means configured to have at least one alternating current flowing along the conducting means between the first region and the second region, the means for channeling magnetic flux and the conducting means configured to reduce power loss within the means for channeling magnetic flux caused by a circumferential magnetic flux generated within the means for channeling magnetic flux by the at least one alternating current, wherein the at least one orifice interrupts the circumferential magnetic flux generated within the means for channeling magnetic flux by the at least one alternating current flowing along the conducting means.

30. An electrical device configured to wirelessly transmit or wirelessly receive power as part of a wireless power transfer system, the electrical device comprising:

a ferromagnetic material comprising at least one orifice, at least one portion of the at least one orifice aligned with a direction of a magnetic flux in the ferromagnetic material, the magnetic flux used for inductive power transfer;

a first electrical conduit extending through the at least one orifice of the ferromagnetic material from a first region on a first side of the ferromagnetic material to a second region on a second side of the ferromagnetic material, the second side opposite to the first side, the first electrical conduit configured to have a first alternating current flowing along the first electrical conduit between the first region and the second region; and a second electrical conduit extending from the first region on the first side of the ferromagnetic material to the second region on the second side of the ferromagnetic material, the second electrical conduit configured to have a second alternating current flowing along the second electrical conduit between the first region and the second region, wherein either the first electrical conduit and the second electrical conduit both extend through a contiguous, unitary orifice of the at least one orifice, the contiguous, unitary orifice comprising two first portions each of which contains one of the first electrical conduit and the second electrical conduit, and a second portion extending between the two first portions in a direction generally parallel to the direction of the magnetic flux in the ferromagnetic material, or the second electrical conduit does not extend through the ferromagnetic material and the at least one orifice comprises an orifice that contains the first electrical conduit, the orifice extending across the ferromagnetic material between the first electrical conduit to an edge of the ferromagnetic material in the direction generally parallel to the direction of the magnetic flux in the ferromagnetic material.

31. The electrical device of claim 30, wherein the electrical device comprises a wireless transmitter, a wireless receiver, or both.

32. The electrical device of claim 30, wherein the orifice extending across the ferromagnetic material comprises a first portion that contains the first electrical conduit and a second portion that extends from the first portion to the edge of the ferromagnetic material.

33. The electrical device of claim 32, wherein the second portion of the orifice extending across the ferromagnetic material extends in the direction generally parallel to the direction of the magnetic flux in the ferromagnetic material.

34. The electrical device of claim 30, wherein the at least one orifice comprises an air gap or a non-ferromagnetic material.

* * * * *